United States Patent
Zagata

[11] Patent Number: 5,163,745
[45] Date of Patent: Nov. 17, 1992

[54] DOOR CLOSET

[76] Inventor: Robert Zagata, 24 Laurel Ave., Old Bridge, N.J. 08857

[21] Appl. No.: 729,188

[22] Filed: Jul. 12, 1991

[51] Int. Cl.⁵ .............................................. A47B 67/02
[52] U.S. Cl. .................................... 312/242; 312/292; 312/223.5; 362/32; 362/133
[58] Field of Search ............... 211/34, 35, 36; 362/32, 362/133, 155; 312/292, 291, 223, 242

[56] References Cited

U.S. PATENT DOCUMENTS

| | | | |
|---|---|---|---|
| 2,131,680 | 9/1938 | Zahodiakin | 312/292 |
| 2,411,100 | 11/1946 | Macdonald | 362/155 X |
| 3,822,925 | 7/1974 | Osroff | 312/242 |
| 3,918,670 | 11/1975 | Doherty | 211/35 |
| 4,152,752 | 5/1979 | Niemi | 362/32 |
| 4,460,094 | 7/1984 | Schoen | 211/35 |
| 4,918,579 | 4/1990 | Bennett | 362/32 |
| 5,932,957 | 7/1991 | Canfield | 312/133 |

Primary Examiner—Joseph Falk
Attorney, Agent, or Firm—Leon Gilden

[57] ABSTRACT

A door closet construction includes a door member, including a door frame perimeter, with the door frame perimeter including a closet box extending rearwardly thereof to define a compartmented chamber for containing various articles. The door member includes a closet box door pivotally mounted to the door frame perimeter and coplanar with the door frame perimeter in a closed orientation relative thereto. A modification of the invention includes fiber optic illumination selectively illuminating various chambers within the closet box for indication of articles positioned therewithin and operative through a switch member when the closet box door is opened relative to the closet box.

1 Claim, 4 Drawing Sheets

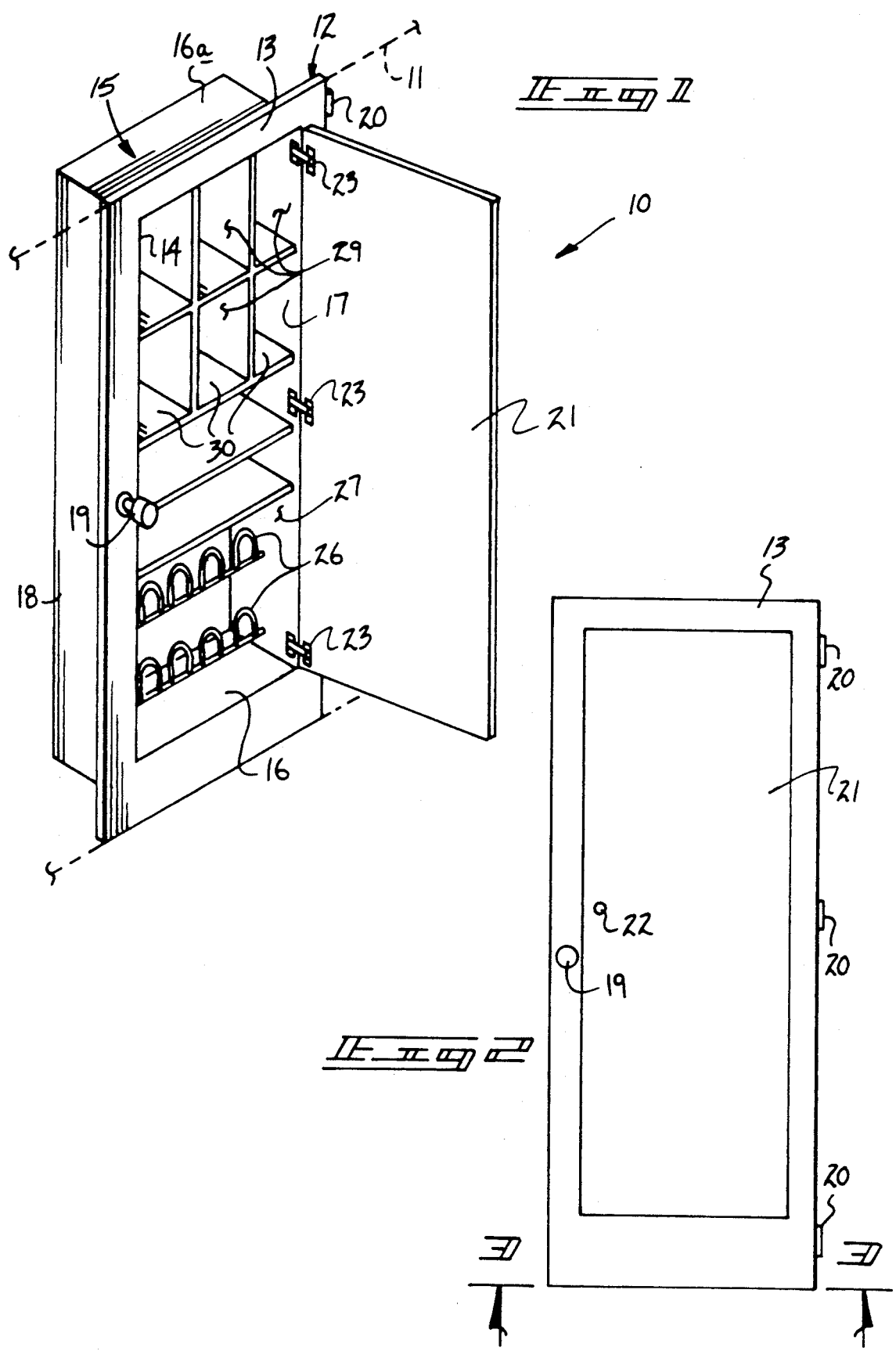

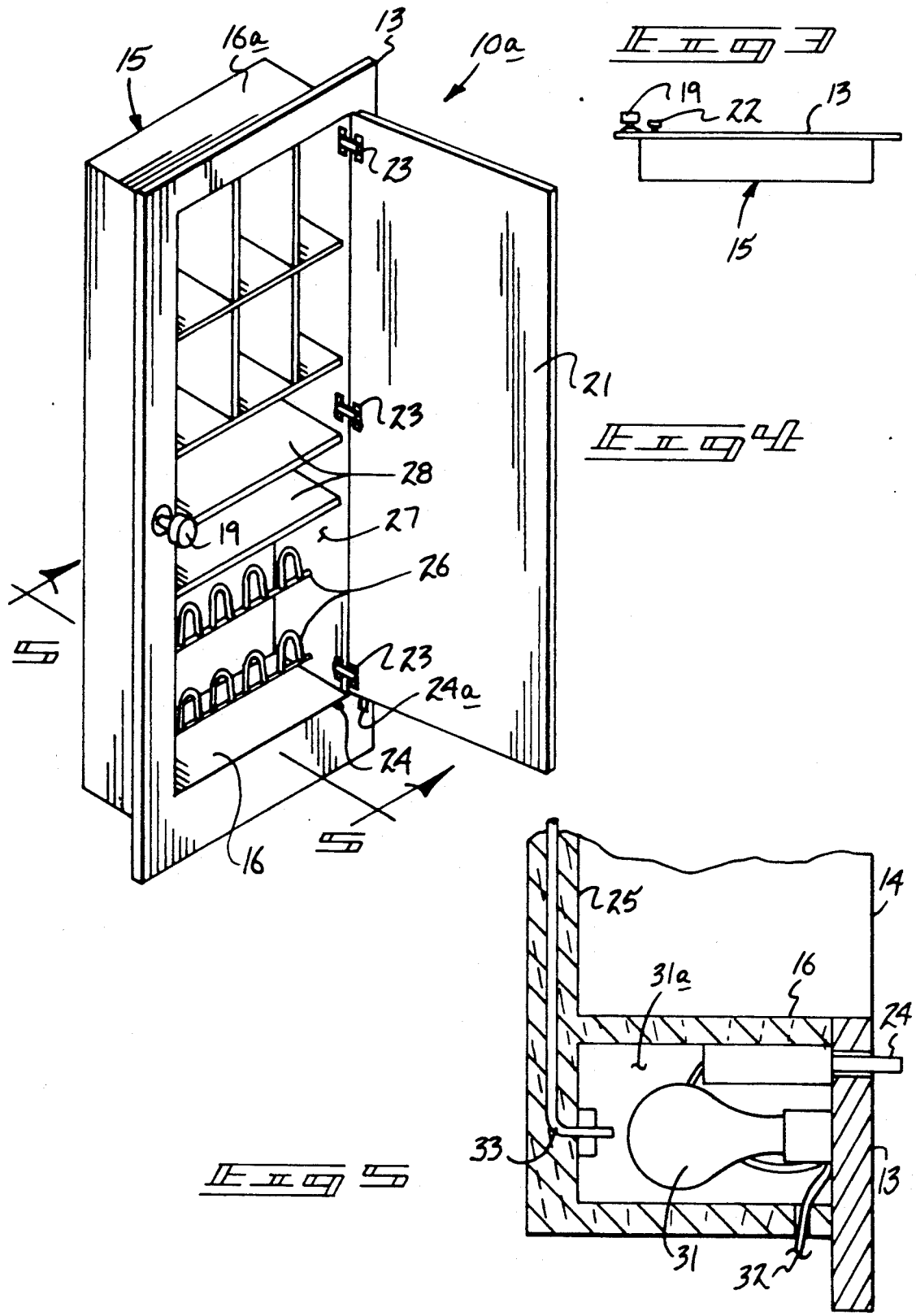

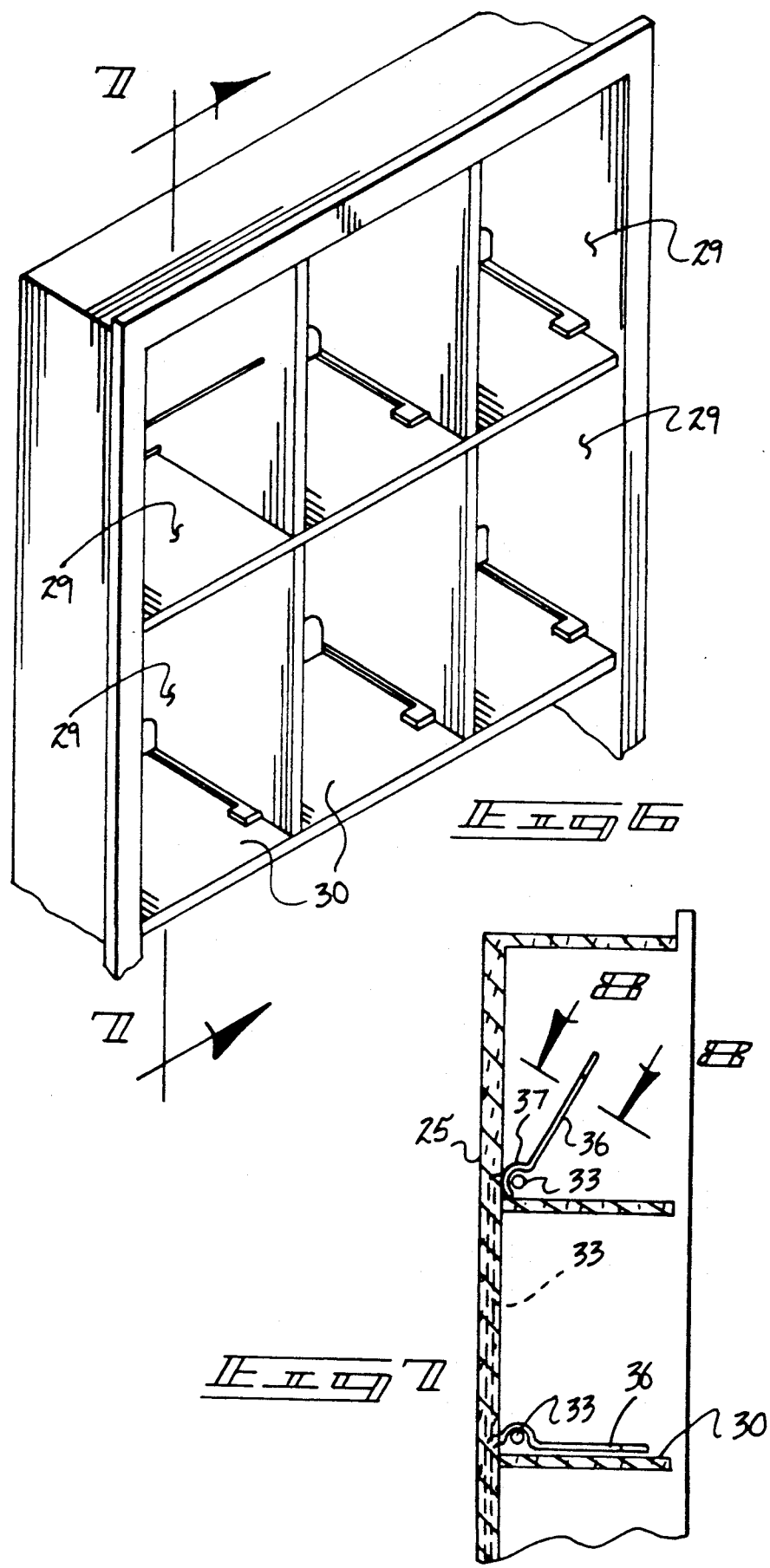

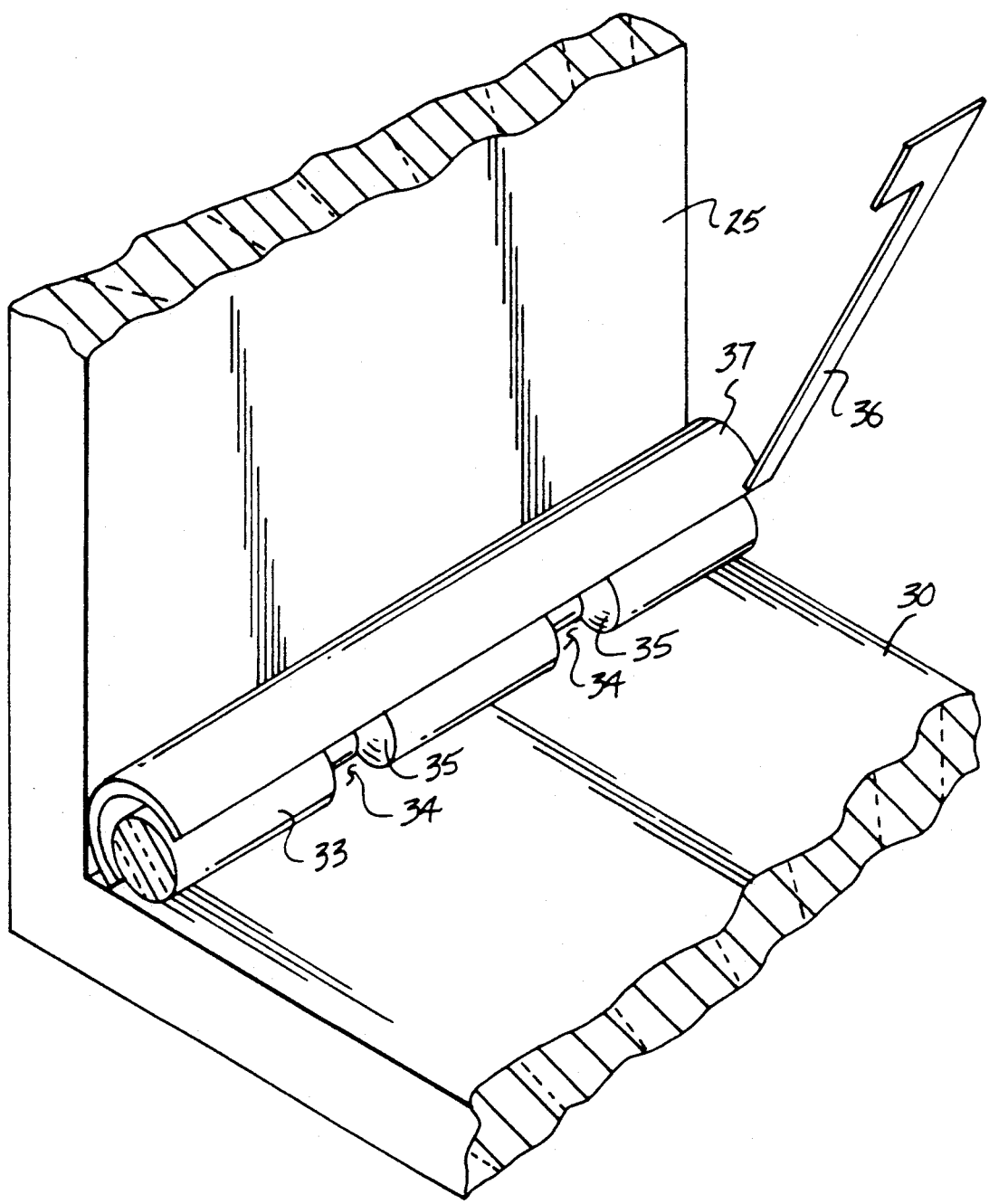

DOOR CLOSET

BACKGROUND OF THE INVENTION

1. Field of the Invention

The field of invention relates to closet construction, and more particularly pertains to a new and improved door closet wherein the same is arranged to efficiently utilize space of a closet door pivotally mounted within a wall member.

2. Description of the Prior Art

Closets of various types are utilized in the prior art for efficient storage and utilization of various components. Such structure is exemplified in U.S. Pat. No. 4,801,182 to Metcalf, et al. wherein a refrigerator door is provided with various compartments selectiely mounted relative to the refrigerator door.

U.S. Pat. No. 4,221,442 to Harangozo sets forth a modular wall cabinet and ash tray apparatus arranged for mounting within a framework within a wall surface.

U.S. Pat. No. 4,408,811 to Richardson, et al. sets forth a wall mounted paper towel handling unit wherein a closet door is opened to expose various compartments therewithin for the mounting and dispensing of articles within a lavatory environment.

U.S. Pat. No. 4,294,498 to Van Luit sets forth a wall cabinet, wherein the door includes various compartments therewithin.

As such, it may be appreciated that there continues to be a need for a new and improved door closet as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of closet construction now present in the prior art, the present invention provides a door closet wherein the same is arranged to efficiently utilize space of a closet door relative to a wall surface pivotally mounting the closet door. As such, the general purpose of the present invention, which will be described subsequently in greater detail, is to provide a new and improved door closet which has all the advantages of the prior art closet construction and none of the disadvantages.

To attain this, the present invention provides a door closet construction including a door member, including a door frame perimeter, with the door frame perimeter including a closet box extending rearwardly thereof to define a compartmented chamber for containing various articles. The door member includes a closet box door pivotally mounted to the door frame perimeter and coplanar with the door frame perimeter in a closed orientation relative thereto. A modification of the invention includes fiber optic illumination selectively illuminating various chambers within the closet box for indication of articles positioned therewithin and operative through a switch member when the closet box door is opened relative to the closet box.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved door closet which has all the advantages of the prior art closet construction and none of the disadvantages.

It is another object of the present invention to provide a new and improved door closet which may be easily and efficiently manufactured and marketed.

It is a further object of the present invention to provide a new and improved door closet which is of a durable and reliable construction.

An even further object of the present invention is to provide a new and improved door closet which is susceptible of a low cost of manufacture with regard to both materials and labor, and which accordingly is then susceptible of low prices of sale to the consuming public, thereby making such door closets economically available to the buying public.

Still yet another object of the present invention is to provide a new and improved door closet which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic frontal view, taken in elevation, of the instant invention.

FIG. 3 is an orthographic top view of the instant invention.

FIG. 4 is an isometric illustration of a modification of the invention.

FIG. 5 is an orthographic view, taken along the lines 5—5 of FIG. 4 in the direction indicated by the arrows.

FIG. 6 is an isometric enlarged illustration of the modified closet door upper chambers.

FIG. 7 is an orthographic view, taken along the lines 7—7 of FIG. 6 in the direction indicated by the arrows.

FIG. 8 is an isometric illustration, taken along the lines 8—8 of FIG. 7 in the direction indicated by the arrows.

DESCRIPTION OF THE PREFERRED EMBODIMENT

With reference now to the drawings, and in particular to FIGS. 1 to 8 thereof, a new and improved door closet embodying the principles and concepts of the present invention and generally designated by the reference numerals 10 and 10a will be described.

More specifically, the door closet 10 of the instant invention essentially comprises the apparatus mounted within a wall surface 11 defining a closet door of a conventional cavity within the wall surface 11 to provide access thereto. The door closet 10 includes a door member 12 defined by a door frame perimeter 13, with a central door frame perimeter entrance 14 directed therethrough, with the entrance 14 coplanar with the door frame perimeter 13. A closet box 15 projects rearwardly of the door frame perimeter 13 and includes a floor 16 spaced from an overlying roof 16a. A closet box first side wall 17 is spaced from a closet box second side wall 18. The door frame 13 includes a door frame perimeter handle 19 fixedly mounted to the door frame adjacent the entrance 14. A plurality of first hinges 20 pivotally mount the door frame perimeter 13 relative to the wall surface 11. A closet box door 21 is hingedly mounted within the entrance 14 and is of a complementary configuration relative thereto and coplanar to the door frame perimeter 13 when in a closed orientation relative to the closet box 15. A closet box door handle 22 is fixedly mounted to the closet box door 21. A plurality of closet box door hinges 23 pivotally mount the closet box door 21 relative to the door frame perimeter 13. A plurality of shoe rack brackets 26 are fixedly mounted within a lower closet box cavity 27 within the closet box 15. Intermediate shelves 28 are positioned above the shoe rack brackets 26 and a plurality of chambers 29 mounted above the intermediate shelves 28. The chambers each include a chamber floor. A wall box rear wall 25 is arranged coextensively and orthogonally oriented relative to the closet box side walls, roof, and floor.

In this manner, the door closet 10, as illustrated in FIGS. 1-3 for example, permit convenience of accessory storage within the door member 12 and thereby enhance efficient utilization of space relative to a closet cavity.

The door closet 10a, as illustrated in FIGS. 4-8, illustrates the use of an illumination bulb 31 mounted within an illumination bulb chamber mounted to the door frame perimeter 13 below the closet box floor 16. Switch 14 projects orthogonally through the door frame perimeter 13 adjacent the floor 16 and is selectively operative by a striker plate 24a mounted to a lower terminal edge of the closet box door 21, as illustrated in FIG. 4. In this manner, selective illumination of the bulb is effected upon opening the door 21, as illustrated in FIG. 4. An electrical transmission line 32 in electrical communication with the illumination bulb 31 and switch 24 is connected to a conventional A.C. or D.C. source for providing a constant source of electrical energy. A fiber optic cable 33 lower terminal end is in adjacent confrontation with the illumination bulb 31 and is directed through the wall box rear wall 25. The fiber optic cable 33 is directed through the rear wall 25 and includes a plurality of junctions directed through the upper and lower rows of chambers 29. In each chamber 29 (see FIG. 8 for example) the fiber optic cable 33 includes a plurality of notches 34 to expose confronting conical cable surfaces 35 to direct illumination exteriorly of the cable 33 for illumination within each chamber 29. A lever 36 is orthogonally mounted to a semi-cylindrical shield 37 that is selectively and pivotally mounted about the fiber optic cable 33 contained within each chamber 31. In this manner with the lever 36 in a first position adjacent the chamber floor 30, the fiber optic cable 33 and associated notches 34 are covered, whereupon positioning of various articles within a chamber 29, the lever 36 is lifted to a second raised position, with the semi-cylindrical shield 37 pivoted to uncover or expose the notches 34 directing illumination into the chamber to indicate positioning of various articles therewithin as a reminder as to which chamber is being utilized by an individual. In this manner, time is saved in directing an individual into which chambers are being occupied by various articles and the like.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A door closet, comprising,
 a door member, the door member including a door frame perimeter, the door frame perimeter including a perimeter first side edge and perimeter second side edge, the perimeter first side edge includes a plurality of hinges mounted thereto for securement to a wall surface, wherein the door frame second side edge includes a door frame perimeter handle mounted adjacent the second side edge for manual grasping of the frame perimeter handle permitting pivotment of the door frame perimeter about the hinges, and the door frame perimeter including a central entrance opening, the central entrance opening arranged coplanar relative to the door frame perimeter, and a closet box fixedly and orthogonally mounted to the door frame perimeter extending rearwardly of the door frame perimeter about the entrance opening, and a closet box door complementarily received within the entrance opening wherein the closet door includes further hinges about a closet box door first side edge for pivotment of the closet box door relative to the door frame perimeter, and a closet box door handle positioned adjacent a closet box door second side edge permitting manual grasping of the closet box door handle and pivotment of the closet box door relative to the door frame perimeter about the further hinges, and the closet box includes a closet box floor spaced from a closet box roof, and a closet box first side wall spaced from a closet box second side wall, and the closet box including a lower closet box cavity, including at least one shoe rack bracket mounted between the closet box first side wall and the closet box second side wall, and a plurality of intermediate shelves mounted above the at least one shoe rack bracket for compartmentalizing the closet box, and at least one row of chambers mounted within the closet box between the intermediate shelves and the closet box roof, and the plurality of chambers each including a chamber floor, and the closet box including a closet box rear wall mounted coextensively between the closet box floor and the closet box roof and extending between the closet box first side wall and the closet box second side wall, and an illumination bulb chamber mounted rearwardly of the door frame perimeter below the closet box floor, the illumination bulb chamber including an illumination bulb mounted therewithin, and a switch member mounted within the illumination bulb chamber, including an actuator rod extending through the door frame perimeter adjacent the closet box floor, and the closet box door including a striker plate mounted to a lower edge of the closet box door for effecting selective actuation of the switch rod for selective illumination of the illumination bulb with the illumination bulb chamber, and a fiber optic cable including a fiber optic cable lower terminal end, the lower terminal end positioned adjacent to and in confrontation with the illumination bulb, the fiber optic cable directed through the closet box rear wall and extending through the chambers, wherein the switch is operative for selective illumination of the illumination bulb upon opening of the closet box door relative to the closet box, and the fiber optic cable includes a plurality of notches within each chamber of the plurality of chambers, and the notches include confronting conical surface for projecting illumination from the fiber optic cable, and a semi-cylindrical shield pivotally mounted about the fiber optic cable, and the semi-cylindrical shield including a lever orthogonally mounted with the semi-cylindrical shield projecting forwardly thereof over the chamber floor, and the lever pivotal from a first position adjacent the chamber floor for concealing the notches, and the lever pivotal to a second raised position relative to the chamber floor for revealing the notches for providing visual illumination upon illumination of the illumination bulb.

* * * * *